(12) United States Patent
Zettell

(10) Patent No.: US 9,157,565 B2
(45) Date of Patent: Oct. 13, 2015

(54) ENCAPSULATED INSULATION

(71) Applicant: The Dragon Group, LLC, Hayden, ID (US)

(72) Inventor: Adrian William Zettell, Newburg, ND (US)

(73) Assignee: The Dragon Group, LLC, Hayden, ID (US)

(*) Notice: Subject to any disclaimer, the term of this patent is extended or adjusted under 35 U.S.C. 154(b) by 0 days.

(21) Appl. No.: 14/522,904

(22) Filed: Oct. 24, 2014

(65) Prior Publication Data
US 2015/0114510 A1    Apr. 30, 2015

Related U.S. Application Data

(60) Provisional application No. 61/895,869, filed on Oct. 25, 2013.

(51) Int. Cl.
F16L 59/00    (2006.01)
F16L 59/02    (2006.01)

(52) U.S. Cl.
CPC .................................. *F16L 59/023* (2013.01)

(58) Field of Classification Search
CPC ...... F16L 59/023; F16L 59/022; B29C 65/00; Y10T 428/1314
USPC .................................................... 138/149, 151
See application file for complete search history.

(56) References Cited

U.S. PATENT DOCUMENTS

| | | | | |
|---|---|---|---|---|
| 312,037 A * | 2/1885 | Suhr | | 138/149 |
| 4,772,507 A * | 9/1988 | Leo et al. | | 428/218 |
| 5,006,185 A * | 4/1991 | Anthony et al. | | 156/193 |
| 6,460,576 B2 * | 10/2002 | Vitoorapakorn | | 138/149 |
| 2012/0043018 A1 * | 2/2012 | Blair | | 156/289 |

* cited by examiner

Primary Examiner — Jeanette E Chapman
Assistant Examiner — Daniel Kenny
(74) Attorney, Agent, or Firm — Lee & Hayes, PLLC

(57) ABSTRACT

This application describes insulated casings with cores of insulating material, coated with or otherwise encapsulated in a shell material are disclosed. A hinge may be fixed to first and second encapsulated cores and couple the first and second encapsulated cores to allow the insulated casings to removably cover a conduit.

11 Claims, 4 Drawing Sheets

ENCAPSULATED INSULATION

This application claims the benefit of U.S. Provisional Application No. 61/895,869 filed on Oct. 25, 2013, which is incorporated by reference herein in its entirety.

BACKGROUND

Insulation often covers pipes that transport a product in extreme temperatures, such as very low temperatures. Some insulation is formed of fiberglass, foam or wool. However, these types of insulations are often relatively absorbent, in the case of fiberglass, or relatively fragile, in the case of foam. Given the absorptive qualities of the fiberglass, in the event that a pipe leaks or breaks, the product inside the pipe (e.g., oil) may be leaking outside of the pipe and into the pipe insulation, after which the insulation is no longer usable. Because the soiled insulating material must be disposed of and new insulation must be obtained, the cost of repairing the leaking and/or broken pipe is increased. In addition, the disposal of the ruined insulation and the installation of the new insulation may be labor intensive, again driving up a cost of the broken pipe.

Thus, there remains a need to develop new pipe insulations formed of materials which are reusable in an event of a leak and/or a break, are much faster to install than existing pipe insulations, much more durable than existing protective coverings, and/or are more cost effective than existing pipe insulations.

BRIEF SUMMARY

This Brief Summary is provided to introduce simplified concepts relating to insulated casings for conduits and techniques for covering conduits with insulated casings, which are further described below in the Detailed Description. This Summary is not intended to identify essential features of the claimed subject matter, nor is it intended for use in determining the scope of the claimed subject matter.

This disclosure relates to insulated casings including cores of insulating material, coated with or otherwise encapsulated in a shell material, and techniques for installing such assemblies. In some embodiments, such insulated casing may removably cover and insulate conduits (e.g., pipes and/or fittings) and, in the event of a leak and/or a break in a conduit, such insulated casings may be cleaned (e.g., wiped off) and reinstalled to cover and insulate the repaired conduit.

In some examples the insulated casings may include first and second core sections that, when coupled, define a void for receiving a conduit. For example, the insulated casings may include first and second encapsulated foam core sections that, when coupled, define a cylindrical void for receiving a conduit. The core sections may be used to insulate the conduits (e.g., a pipe) that transports liquid and/or gas, and may be reusable in an event of a leak and/or a break in the conduit.

In some examples each of the first and second core sections may have an interior surface that faces the conduit when the void receives the conduit, an exterior surface that faces opposite the interior surface, and end surfaces. In some examples each of the first and second core sections may be coated in a polymer that substantially covers the exterior surface. In another example, each of the first and second core sections may be coated in a polymer that substantially covers the interior surface, the exterior surface, and the end surfaces.

In some examples the insulated casings may include a hinge. The hinge may be formed of a polymer and fixed to a portion of the exterior surface of the first core section and a portion of the exterior surface of the second core section. The hinge may couple the first and second core sections to allow the insulated casings to removably cover the conduit. For example, the hinge may couple the first and second core sections to allow the insulated casings to be removed from a leaking and/or broken conduit, cleaned (e.g., wiped off), and reinstalled to cover the repaired or replaced conduit. In another example, the hinge may couple the first and second core sections to allow the insulated casings to be removably installed while a conduit is in use (e.g., communicatively coupled to one or more other conduits that may or may not be transporting a liquid and/or a gas).

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
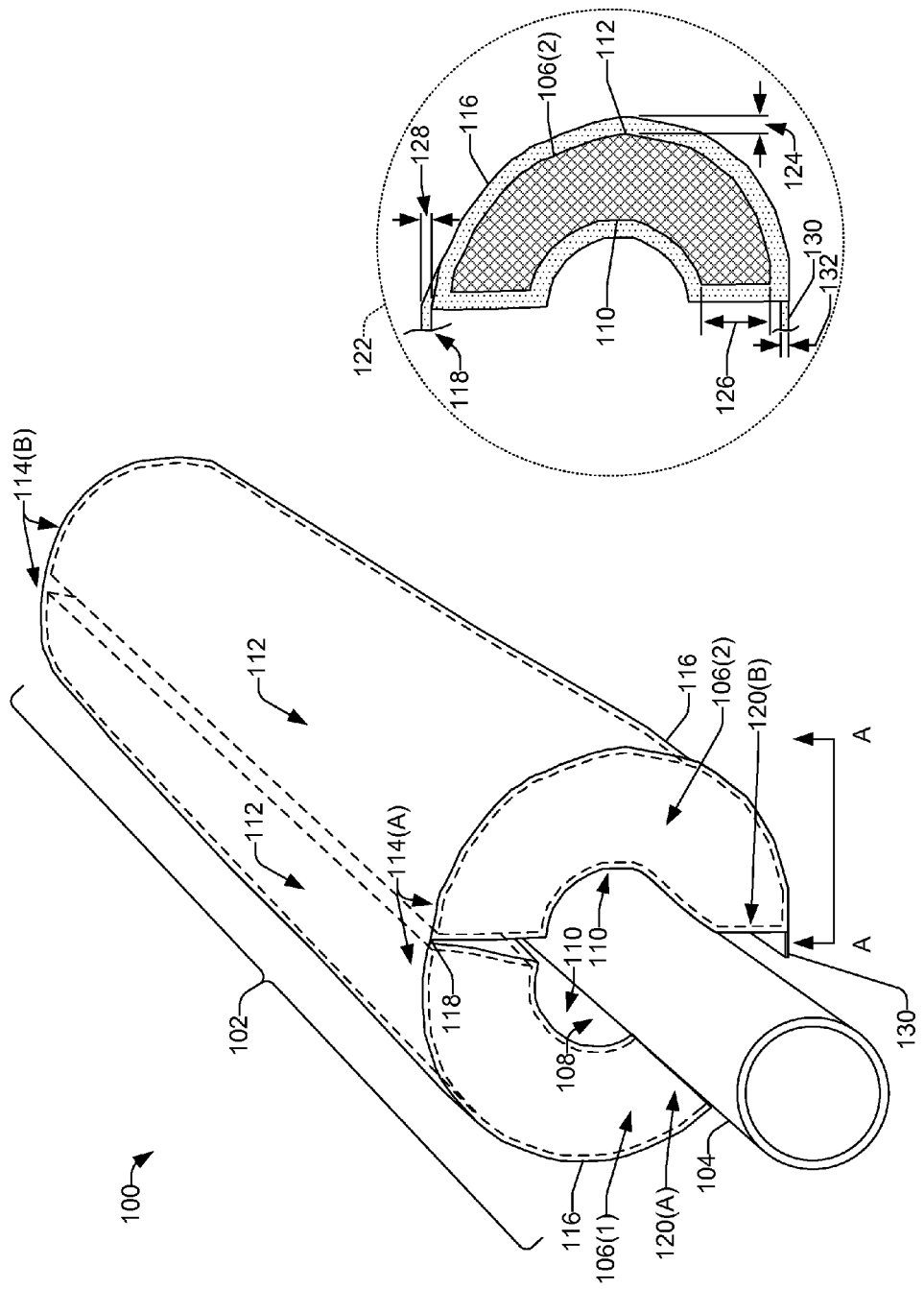
FIG. 1 illustrates a perspective view of an insulated casing arranged on a conduit.

As noted above, pipe insulations are still labor intensive to install, repair, and/or replace. Further, repairing a leaking and or broken insulated pipe is often difficult and costly because the insulating materials cannot be cleaned and must be disposed of. This application describes insulated casings, comprising first and second core sections coated in a material (e.g., a polymer), that reduce costs and require less labor to install as compared with other pipe insulation. These insulated casings can be cleaned and reused in an event of a leaky and/or a broken pipe and, hence, lessen the cost associated with the leaky or broken pipe.

This application also describes various techniques for installing such insulated casings. By way of example and not limitation, the insulated casings herein may be used in the fields of oil and gas pipeline applications, food and beverage applications, watercraft applications, or any other applications where a conduit may be insulated (e.g., because the material within the conduit is extremely hot or cold or the environment surrounding the conduit is extremely hot or cold).

In general, insulated casings as described in this application include first and second core sections that are encapsulated by a relatively tough polymer (e.g., a polyurea such as sprayable polyurea) and, therefore, are relatively less absorbent to liquid and/or gas than fiberglass insulation or other existing insulating foams. This application also describes below techniques for installing such insulated casings in the field. However, other the techniques for installing such insulated casings may also be used.

In some embodiments, the insulated casings may include first and second core sections coated in a polymer that substantially covers an interior surface, an exterior surface, and end surfaces to seal the first and second core sections. Sealing the core sections prevents interaction between the first and second core sections and a surrounding environment. In one example, the polymer coating prevents moisture (e.g., rain, snow, hail) from interacting with the first and second core sections, thus substantially increasing a usable life of the core sections. In another example, the polymer coating prevents objects from interacting with the first and second core sections, thus preventing the objects from penetrating the first and second core sections.

In another example, the polymer coating prevents animals (e.g., mice, birds, and/or insects) from interacting with the first and second foam core sections, thus preventing animals from penetrating the first and second foam core sections. In another example, the polymer coating prevents a liquid (e.g., oil) from a leaking and/or a broken pipe from interacting with the first and second foam core sections, thus preventing the first and second foam core sections from absorbing the liquid. In all of these examples, the polymer coating protects the integrity of the first and second foam core sections.

In the example where the polymer coating prevents the first and second core sections from absorbing the liquid (e.g., oil), the insulated casings can be reused after a leaking and/or broken pipe is repaired. For example, because the polymer coating prevents the first and second core sections from absorbing the liquid (e.g., oil), the polymer coated first and second core sections can be cleaned (e.g., wiped off) and reinstalled to cover the repaired or replaced pipe.

A wall thickness of the polymer coating may vary depending on the specific application. For example, the wall thickness of the polymer coating may be dependent on a thermal material to be coated with the polymer and/or a size of a conduit to be covered by the insulated casings.

In some embodiments, the insulated casings may comprise a hinge fixed to the first core section and the second core section to couple the first and second core sections. For example, the hinge may be formed of polymer and fixed to a portion of an exterior surface of the first core section and a portion of an exterior surface of the second core section to couple the first and second core sections.

In an example where the insulated casings include a hinge fixed to the first core section and the second core section to couple the first and second core sections, the hinge may pivotably couple the first and second core sections to allow the insulated casings to removably cover a conduit. Because the hinge may pivotably couple the first and second core sections, the hinge may allow the insulated casings to be removed from a leaking and/or broken conduit, cleaned (e.g., wiped off), and reinstalled to cover the repaired or replaced conduit. In another example, the hinge may allow the insulated casings to removably cover a conduit while the conduit is in use (e.g., communicatively coupled to one or more other conduits that may or may not be transporting a liquid and/or a gas).

In some embodiments, the first and second core sections may comprise substantially cylindrical tubes of closed cell foam that are shaped to receive a pipe. For example, the first and second core sections may have an interior surface that faces a conduit, an exterior surface that faces opposite the interior surface, and end surfaces. An inside diameter of the first and second core sections may vary depending on the specific application. In some examples, the first and second core sections may have an inside diameter of about 8 inches (20 centimeters).

Similarly, the thickness of the first and second core sections may vary depending on the specific application. In some examples, the first and second core sections may have a thickness of between about ½ inch (1.3 centimeters) and about 5 inches (12.7 centimeters); however, in other examples, the thickness of the first and second core sections may be less than ½ inches (1.3 centimeters) or greater than 5 inches (12.7 centimeters). In a specific example, the first and second core sections may have a thickness of between about ½ inches (1.3 centimeters) and about 2 inches (5 centimeters).

In other embodiments, the first and second core sections may comprise any shape to receive pipes, fittings, or valves. For example, the first and second core sections may comprise substantially rectangular tubes to receive a pipe. In this example, where the first and second core sections may be substantially rectangular tubes, a hinge may be fixed to the first core section and the second core section to couple the first and second core sections.

In another example, the first and second core sections may comprise substantially rectangular portions to receive a fitting (e.g., a union, an elbow, a tee, a wye, a cap, etc.). In another example, the first and second core sections may comprise substantially rectangular portions to receive a valve (e.g., a ball valve, a butterfly valve, a gate valve, a check valve, etc.). In the examples where the first and second core sections may receive a fitting or a valve, a hinge may be fixed to the first core section and the second core section to couple the first and second core sections.

Also, in some embodiments, the polymer coating on the interior surface, the exterior surface, and the end surfaces of the first and second core sections may be at least about 1/16 inch (0.1 centimeters) thick. However, the polymer coating on the interior surface, the exterior surface, and the end surfaces of the first and second core sections need not be the same. In one example, the polymer coating on the exterior surface and/or the end surfaces may be thicker than the polymer coating on the interior surfaces. In another example, the exterior surface and/or the end surfaces may be layered with the polymer coating, while the inside surface may not. However, in other embodiments, any other thickness of polymer coating may be used. Furthermore, the thickness of the polymer coating layered on the interior surface, the exterior surface, and/or the end surfaces of the first and second core sections may be non-uniform.

Ranges of what is considered "relatively low" temperatures and "relatively high" temperatures may vary depending on the application, but in one example "relatively low" temperatures are those of at least about −60 degrees Fahrenheit (−50 degrees Celsius), and "relatively high" temperatures are those of at least about 1200 degrees Fahrenheit (650 degrees Celsius). To be clear, however, this disclosure is not limited to the foregoing ranges of low temperatures or high temperatures.

These and other aspects of the insulated casings will be described in greater detail below with reference to several illustrative embodiments.

Examples of Insulated Casings

This section describes example insulated casings comprising first and second core sections coated in a polymer. These and numerous other insulated casings can be formed according to the techniques described in this section.

FIG. 1 illustrates a perspective view 100 of an insulated casing 102 arranged on a conduit 104. The conduit 104 may comprises a pipe for transporting a fluid or a gas. As shown in FIG. 1, the insulated casing 102 comprises a first core section 106(1) and a second core section 106(2) that, when coupled, define a void 108 for receiving the conduit 104.

Each of the first and second core sections 106(1) and 106 (2) may have an interior surface 110 that faces the conduit 104 when the void 108 receives the conduit 104, an exterior surface 112 that faces opposite the interior surface 110, and end surfaces 114(A) and 114(B). FIG. 1 illustrates, in this embodiment, each of the first and second core sections 106(1) and 106(2) are coated in a polymer 116 that substantially covers the interior surface 110, the exterior surface 112, and the end surfaces 114(A) and 114(B). However, in other embodiments, the interior surface 110 and/or end surfaces 114(A) and 114(B) of the first core section 106(1) and/or the second core section 106(2) need not be covered with the polymer 116 and may be void of the polymer 116. The polymer 116 substantially covering the interior surface 110, the exterior surface 112, and the end surfaces 114(A) and 114(B) may define a shell, and may seal and/or strengthen each of the first and second core sections 106(1) and 106(2).

The insulated casing 102 may include a hinge 118, formed of polymer and fixed to a portion of the exterior surface 112 of the first core section 106(1) and a portion of the exterior surface 112 of the second core section 106(2). The hinge 118 may couple the first and second core sections 106(1) and 106(2). For example, the hinge 118 may pivotably couple the first and second core sections 106(1) and 106(2) to allow the insulated casing 102 to removably cover the conduit 104. For example, the hinge 118 may pivotably couple the first and second core sections 106(1) and 106(2) to allow the insulated casing 102 to be removed from the conduit 104 and cleaned in the event of a leak or a break in the conduit 104. In another example, the hinge 118 may pivotably couple the first and second core sections 106(1) and 106(2) to allow the insulated casing 102 to removably cover the conduit 104 while the conduit is transporting a fluid or a gas.

The hinge 118 may be fixed to the respective portions of the exterior surfaces 112 of the first and second core sections 106(1) and 106(2) and arranged parallel to a center axis of the insulated casing 102. In one example, the hinge 118 may be formed of a polymer sprayed on to the polymer 116 covering the first and second core sections. In this example, the hinge 118 may be formed of the same polymer as the polymer 116 covering the first and second core sections. Moreover, the hinge 118 may be chemically bonded to the polymer 116 covering the first and second core sections.

The first and second core sections 106(1) and 106(2) may include cooperating faces 120(A) and 120(B) arranged opposite the hinge 118. For example, first and second core sections 106(1) and 106(2) may have cooperating faces 120(A) and 120(B) arranged longitudinally between end surfaces 114(A) and 114(B) of the first and second core sections 106(1) and 106(2) and below the hinge 118. In some embodiments, the insulated casing 102 may include a mechanical seal fixed to at least one of the cooperating faces 120(A) or 120(B) to seal the cooperating faces 120(A) and 120(B) when coupled.

FIG. 1 also illustrates a section line A-A. The section line A-A is approximate to the end surface 114(A) of the second core section 106(2). Detail view 122, illustrates a section view of the second core section 106(2) taken along the section line A-A. Detail view 122 illustrates the second core section 106(2) coated in the polymer 116 that substantially covers the interior surface 110 and the exterior surface 112. The coating of polymer 116 may have a wall thickness 124 of at least about 5/64 inch (0.2 centimeters). In one example, the polymer 116 may comprise a relatively tough polymer (e.g., a polyurea such as a sprayable polyurea).

Detail view 122 illustrates the first and second core sections 106(1) and 106(2) may have a cross-sectional thickness 126 of about 2 inch (5 centimeters). The first and second core sections 106(1) and 106(2) may be formed of foam, a fabric, an aerogel, a paper, a metal, a ceramic, a composite etc. In one example, the first and second core sections 106(1) and 106(2) may be formed of relatively less absorbent foam (e.g., closed cell polyurethane foam or sprayable closed cell polyurethane foam).

Detail view 122 illustrates the hinge 118 fixed to a portion of the exterior surface 112 of the second core section 106(2). While detail view 122 illustrates the hinge 118 may comprise at least one layer of the same polymer 116 covering the exterior surface 112, the hinge 118 may comprise at least one layer of another polymer different from the polymer 116 covering the exterior surface 112. In one example, the hinge 118 may have a cross-sectional thickness 128 of about 5/64 inch (0.2 centimeters).

In this embodiment of the insulated casing 102, FIG. 1 illustrates the insulated casing 102 may include a drip edge 130. The drip edge 130 may be formed of polymer and fixed to the polymer 116 that substantially covers the interior surface 110, the exterior surface 112, and the end surfaces 114(A) and 114(B) of the first or second core sections 106(1) and 106(2). For example, the drip edge 130 may be formed of the same polymer as the polymer 116 covering the first and second core sections and sprayed on to a portion of the polymer 116 covering the first and second core sections. The drip edge 130 formed of the same polymer as the polymer 116 covering the first and second core sections may be chemically bonded to the polymer 116 covering the first and second core sections. Detail view 122 illustrates the drip edge 130 may have a cross-sectional thickness 132 of about 5/64 inch (0.2 centimeters).

The drip edge 130 may cover an interface where the cooperating faces 120(A) and 120(B) of the insulated casings are coupled to provide an overlapping seal. The drip edge 130 may be arranged along either or both of the cooperating faces 120(A) or 120(B) (e.g., cooperating face 120(B)) and may extend a distance of about 2 inches (5 centimeters) from the cooperating faces 120(A) or 120(B). In one example, the drip edge 130 may be arranged along the cooperating face 120(B) to provide an overlapping seal with the cooperating face 120(A). In another example, a first portion of the drip edge 130 may be arranged along the cooperating face 120(B) and a second portion of the drip edge 130 may be arranged along the cooperating face 120(A).

Figure 2:
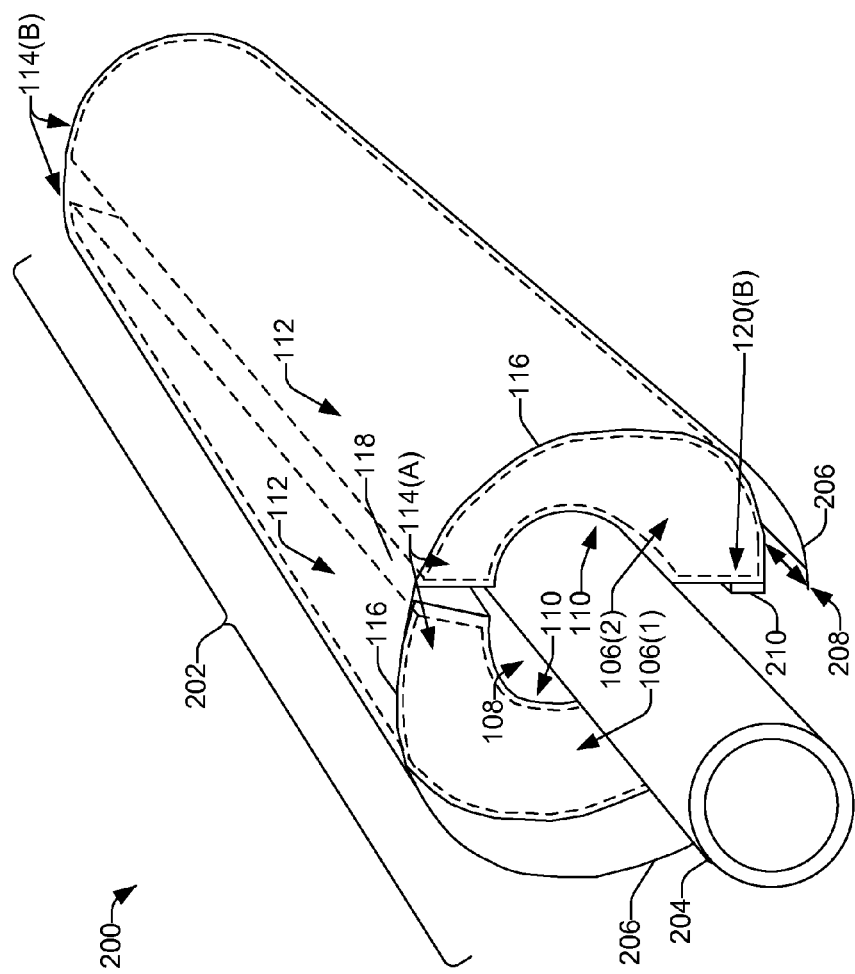
FIG. 2 illustrates a perspective view of another embodiment of an insulated casing arranged on a conduit.

FIG. 2 illustrates a perspective view 200 of another embodiment of an insulated casing 202 arranged on a conduit 204. Similar to insulated casing 102, FIG. 2 illustrates the insulated casing 202 comprises the first core section 106(1) and the second core section 106(2) that, when coupled, define a void 108 for receiving the conduit 204. FIG. 2 illustrates, in this embodiment, each of the first and second core sections 106(1) and 106(2) are coated in the polymer 116 that substantially covers the interior surface 110, the exterior surface 112, and the end surfaces 114(A) and 114(B).

In this embodiment of the insulated casing 202, FIG. 2 illustrates the insulated casing 202 may include a butt joint 206. The butt joint 206 may be formed of polymer and fixed to the polymer 116 that substantially covers the interior surface 110, the exterior surface 112, and the end surfaces 114(A) and 114(B) of the first or second core sections 106(1) and 106(2). For example, the butt joint 206 may be formed of the same polymer as the polymer 116 covering the first and second core sections and sprayed on to a portion of the polymer 116 covering the first and second core sections. The butt joint 206 formed of the same polymer as the polymer 116 covering the first and second core sections may be chemically bonded to the polymer 116 covering the first and second core sections.

The butt joint 206 may be arranged to receive an end (e.g., end surface 114(A) or 114(B)) of another insulated casing (e.g., insulated casing 102). For example, the butt joint 206 may provide for coupling butt ends of insulated casings. The butt joint 206 may cover an interface where the butt ends of the insulated casings are coupled to provide a sealing and clamping surface to the next insulated section (e.g., insulated casing 102, insulated casing 202, insulated casing 302, insulated casing for a fitting, insulated casing for a valve, etc.).

The butt joint 206 may extend a distance 208 of about 2 inches (5 centimeters) from one or more of the end surfaces 114(A) and 114(B) of the first or second core sections 106(1) and 106(2). The butt joint 206 may have a wall thickness of about 5/64 inch (0.2 centimeters).

FIG. 2 illustrates the insulated casing 202 may include a mechanical seal 210 arranged on one or more of the cooperating faces 120(A) and 120(B) arranged opposite the hinge 118. For example, the mechanical seal 210 may be fixed to the cooperating face 120(B) to seal the cooperating faces 120(A) and 120(B) when the insulated casing 202 removably covers the conduit 204. In one example, the mechanical seal 210 may comprise a gasket. For example, the mechanical seal 210 may comprise a sheet gasket or an O-ring. In another example, the mechanical seal 210 may comprise weatherstripping. In some examples, a mechanical seal may be arranged on one or more of the end surfaces 114(A) and 114(B). For example, a mechanical seal may be arranged on the end surfaces (e.g., end surfaces 114(A)) of the core sections 106(1) and 106(2) to couple with end surfaces (e.g., end surfaces 114(B)) of another insulated casing (e.g., insulated casing 202).

Figure 3:
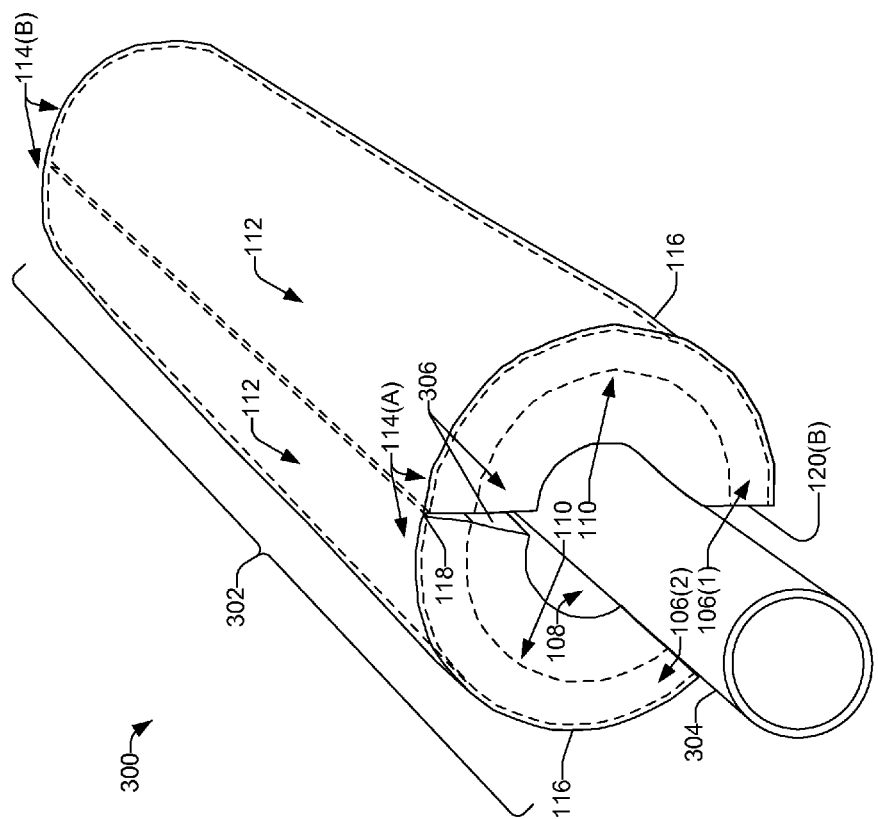
FIG. 3 illustrates a perspective view of another embodiment of an insulated casing arranged on a conduit.

FIG. 3 illustrates a perspective view 300 of another embodiment of an insulated casing 302 arranged on a conduit 304. The conduit 304 may comprises a pipe for transporting a high temperature fluid and/or a high temperature gas. Similar to insulated casing 102, FIG. 3 illustrates the insulated casing 302 comprises the first core section 106(1) and the second core section 106(2) that, when coupled, define a void 108 for receiving the conduit 304.

FIG. 3 illustrates, in this embodiment, each of the first and second core sections 106(1) and 106(2) are coated in the polymer 116 that substantially covers the exterior surface 112 and the end surfaces 114(A) and 114(B), but not the interior surface 110. For example, the exterior surface 112 and the end surfaces 114(A) and 114(B) may be layered with the polymer coating, while the inside surface may be void of the polymer coating and may not have a layer of the polymer coating. While FIG. 3 illustrates the polymer 116 coating the end surfaces 114(A) and 114(B), the end surfaces 114(A) and 114(B) may not be coated in the polymer 116. Moreover, the end surfaces 114(A) and 114(B) may be partially coated in the polymer 116. For example, the polymer 116 may coat a fraction of the end surfaces 114(A) and 114(B).

In this embodiment of the insulated casing 302, FIG. 3 illustrates the insulated casing 302 may include a barrier layer 306 to prevent heat coming from the conduit 304 from reacting with the material (e.g., a foam, a fabric, an aerogel, a paper, a metal, a ceramic, etc.) forming each of the core sections 106(1) and 106(2). For example, the barrier layer 306 may comprise a fiber (e.g., a Rockwool), a silicone (e.g., a high temperature silicone), or a ceramic arranged to interface with the conduit 304 and prevent the heat coming from the conduit from adversely reacting with the material forming the core sections 106(1) and 106(2). In one example, the barrier layer 306 may be arranged on the interior surface 110 of the core sections 106(1) and 106(2).

In another example, the barrier layer 306 may be encased in a protective layer of material (e.g., silicone, ceramic or polymer) and the barrier layer 306 encased in the protective layer may be partially or completely coated in the polymer 116. In one example, the barrier layer 306 may prevent temperatures of at least about 600 degrees Fahrenheit (310 degrees Celsius) to at most about 2400 degrees Fahrenheit (1300 degrees Celsius) from reacting with the insulating material forming the core sections 106(1) and 106(2). In another example, the barrier layer 306 may prevent temperatures of at most about 1200 degrees Fahrenheit (648 degrees Celsius) from reacting with the insulating material forming the core sections 106(1) and 106(2).

Example Methods of Installing Insulated Casings

Figure 4:
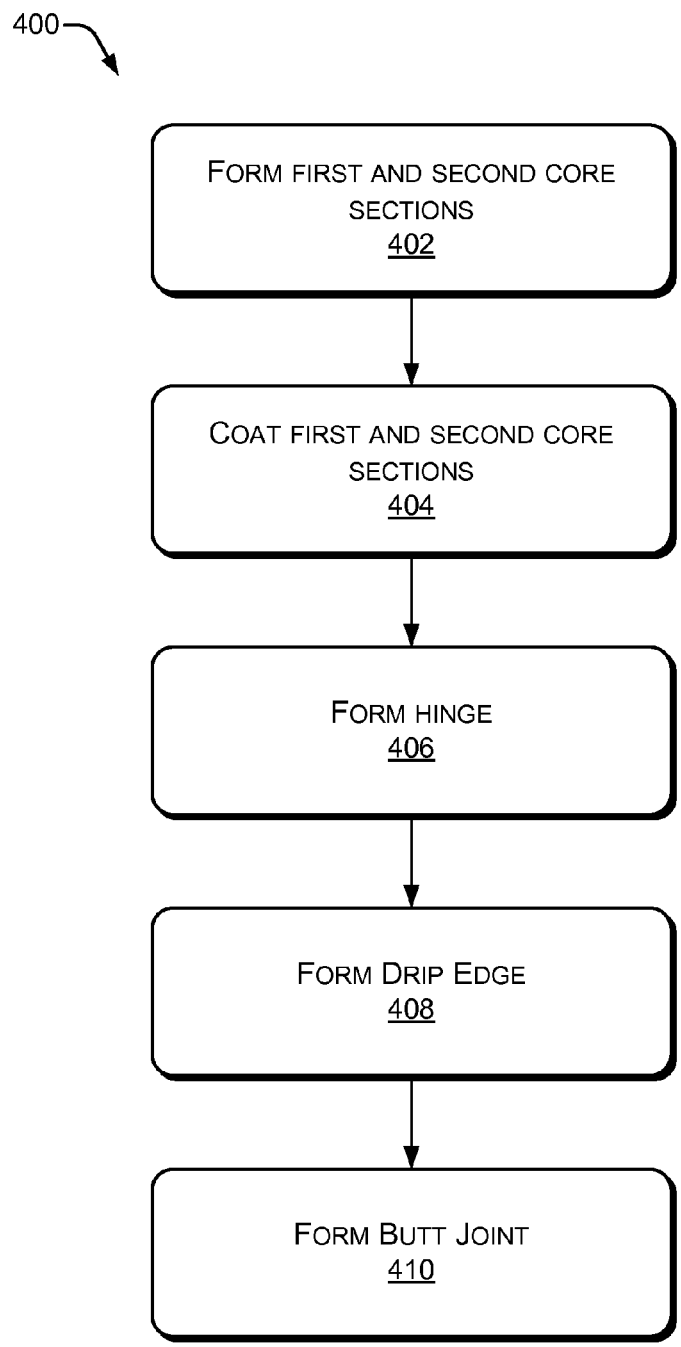
FIG. 4 is a flow diagram illustrating an example process of covering a conduit with an insulated casing.

FIG. 4 illustrates an example process 400 of installing an insulated casing (e.g., insulated casing 102, 202 and/or 302) on a conduit (e.g., conduit 104, 204 and/or 304). By way of example and not limitation, this process may be performed at an oil facility, a gas facility, a plant, a foundry, a factory, a boat yard, in the field, or the like.

Process 400 includes operation 402, which represents forming first and second core sections (e.g., first and second core sections 106(1) and 106(2)) that, when coupled, define a void (e.g., void 108) for receiving the conduit. For example, relatively less absorbent foam (e.g., closed cell polyurethane foam or sprayable closed cell polyurethane foam) may be cut and/or molded to a specification (e.g., dimensions) of the conduit. Each of the first and second core sections may be formed to have an interior surface (e.g., interior surface 110) that faces the conduit when the void receives the conduit, an exterior surface (e.g., exterior surface 112) that faces opposite the interior surface, and end surfaces (e.g., end surfaces 114 (A) and 114(B)).

Process 400 continues with operation 404, which represents coating (e.g., spraying) each of the first and second core sections in a polymer (e.g., polymer 116) such that the polymer substantially covers the exterior surface. In one example, operation 404 may also represent coating each of the first and second core sections in a polymer such that the polymer substantially covers the exterior surface and the end surfaces. In another example, operation 404 may also represent coating each of the first and second core sections in a polymer such that the polymer substantially covers the exterior surface, the interior surface, and the end surfaces.

Process 400 continues with operation 406, which represents forming a hinge (e.g., hinge 118) of polymer fixed to a portion of the exterior surface of the first core section and a portion of the exterior surface of the second core section to couple the first and second core sections. In one example, the hinge may be sprayed on to a portion of the polymer covering the first and second core sections. In this example, the hinge may be formed of the same polymer as the polymer covering the first and second core sections and may be chemically bonded to the polymer covering the first and second core sections.

Process 400 continues with operation 408, which represents forming a drip edge (e.g., drip edge 130) of polymer fixed to a portion of the exterior surface of the first core section and a portion of the exterior surface of the second core section to provide an overlapping seal of an interface between cooperating faces (e.g., cooperating faces 120(A) and 120 (B)) of the first or second core sections. In one example, the drip edge may be sprayed on to a portion of the polymer covering the first and second core sections. In this example, the drip edge may be formed of the same polymer as the polymer covering the first and second core sections and may be chemically bonded to the polymer covering the first and second core sections.

Process 400 may be completed at operation 410, which represents forming a butt joint (e.g., butt joint 206) of polymer fixed to a portion of the exterior surface of the first core section and a portion of the exterior surface of the second core section to receive an end (e.g., end surface 114(A) or 114(B)) of another insulated casing. In one example, the butt joint may be sprayed on to a portion of the polymer covering the first and second core sections. In this example, the butt joint may be formed of the same polymer as the polymer covering the first and second core sections and may be chemically bonded to the polymer covering the first and second core sections.

Conclusion

Although the disclosure uses language specific to structural features and/or methodological acts, the claims are not limited to the specific features or acts described. Rather, the specific features and acts are disclosed as illustrative forms of implementing the invention. For example, the various embodiments described herein may be rearranged, modified, and/or combined. As another example, one or more of the method acts may be performed in different orders, combined, and/or omitted entirely, depending on the insulated casing to be produced.

What is claimed is:

1. A casing for a conduit comprising:
    first and second encapsulated foam core sections that, when coupled, define a cylindrical void for receiving the conduit, wherein:
        each of the first and second encapsulated foam core sections have an interior surface that faces the conduit when the casing covers the conduit, an exterior surface that faces opposite the interior surface, and end surfaces; and
        each of the first and second encapsulated foam core sections are coated in a first layer of sprayable polyurea that substantially covers the interior surface, the exterior surface, and the end surfaces;
    a hinge, formed entirely of a second layer of sprayable polyurea that is bonded to: (i) the first layer of sprayable polyurea that coats the exterior surface of the first encapsulated foam core section, and (ii) the first layer of sprayable polyurea that coats the exterior surface of the second encapsulated foam core section, the hinge formed of the second layer of sprayable polyurea to couple the first and second encapsulated foam core sections; and
    a butt joint formed of sprayable polyurea, the butt joint extending beyond a first end surface of the first encapsulated foam core section and beyond a first end surface of the second encapsulated foam core section, the butt joint to receive an end surface of an additional casing and to provide a clamping surface for clamping the casing to the additional casing;
    wherein the hinge pivotably couples the first and second encapsulated foam core sections to allow the casing to removably cover the conduit.

2. The casing of claim 1, wherein each of the first and second encapsulated foam core sections comprises closed cell foam.

3. The casing of claim 2, wherein the closed cell foam comprises sprayable closed cell foam formed of polyurethane.

4. The casing of claim 1, wherein:
    the first encapsulated foam core section further includes a first cooperating face arranged opposite the hinge; and
    the second encapsulated foam core section further includes: (1) a second cooperating face arranged opposite the hinge and facing the first cooperating face, and (2) and a mechanical seal fixed to the second cooperating face to seal the second cooperating face to the first cooperating face when the casing removably covers the conduit.

5. The casing of claim 4, wherein the mechanical seal comprises a gasket.

6. The casing of claim 4, wherein the mechanical seal comprises a weatherstripping.

7. The casing of claim 4, further comprising at least one drip edge formed of sprayable polyurea, the drip edge extending beyond at least one of the first cooperating face or the second cooperating face.

8. The casing of claim 1, wherein the conduit comprises a pipe for transporting a fluid or a gas, and the hinge is arranged to couple the first and second encapsulated foam core sections such that the casing covers the pipe while the pipe is transporting the fluid or the gas.

9. The casing of claim 1, wherein each of the first and second encapsulated foam core sections includes a barrier layer arranged on the interior surface to prevent heat from reacting with each of the first and second encapsulated foam core sections.

10. The casing of claim 9, wherein the barrier layer comprises a fiber, a silicone, or a ceramic.

11. A method of installing a casing on a conduit comprising:
    forming first and second insulating foam core sections that, when coupled, define a void for receiving the conduit, wherein each of the first and second insulating foam core sections have an interior surface to face the conduit, an exterior surface to face opposite the interior surface, and end surfaces;
    coating each of the first and second insulating foam core sections in a first layer of sprayable polyurea such that the first layer of sprayable polyurea substantially covers at least the interior surfaces, the exterior surfaces, and the end surfaces;
    forming a hinge entirely of a second layer of sprayable polyurea, the hinge bonding to (i) the first layer of sprayable polyurea that coats the exterior surface of the first insulating foam core section, and (ii) the first layer of sprayable polyurea that coats the exterior surface of the second insulating foam core section, the hinge formed of the second layer of sprayable polyurea to couple the first and second insulating foam core sections; and
    forming a butt joint of sprayable polyurea, the butt joint extending beyond a first end surface of the first insulating foam core section and beyond a first end surface of the second insulating foam core section, the butt joint to receive an end surface of an additional casing and to provide a clamping surface for clamping the casing to the additional casing;
    wherein the hinge pivotably couples the first and second insulating foam core sections to allow the casing to removably cover the conduit.

* * * * *